United States Patent [19]

Myslinski et al.

[11] Patent Number: 5,406,188
[45] Date of Patent: Apr. 11, 1995

[54] METHOD AND APPARATUS FOR DISPLAYING A CHARGE LEVEL OF A BATTERY

[75] Inventors: Theodore A. Myslinski, Freehold; Rafael Heredia, Aberdeen, both of N.J.

[73] Assignee: NCR Corporation, Dayton, Ohio

[21] Appl. No.: 56,081

[22] Filed: May 3, 1993

[51] Int. Cl.⁶ .......................... H02J 7/00; G08B 21/00
[52] U.S. Cl. ........................................ 320/14; 340/636
[58] Field of Search .......................... 320/14, 48, 13; 324/429, 430; 340/636

[56] References Cited

U.S. PATENT DOCUMENTS

| | | | |
|---|---|---|---|
| 3,940,679 | 2/1976 | Brandwein et al. | 320/48 |
| 4,698,579 | 10/1987 | Richter et al. | 320/14 |
| 4,755,733 | 7/1988 | Laliberté | 320/14 X |
| 4,827,220 | 5/1989 | Figh | 324/426 |
| 5,027,294 | 6/1991 | Fakruddin et al. | 364/550 |
| 5,043,651 | 8/1991 | Tamura | 320/43 |
| 5,105,180 | 4/1992 | Yamada et al. | 340/636 |
| 5,107,196 | 4/1992 | Agreste, Jr. et al. | 320/13 X |
| 5,124,627 | 6/1992 | Okada | 320/44 |
| 5,130,658 | 7/1992 | Bohmer | 324/435 |
| 5,130,659 | 7/1992 | Sloan | 324/435 |
| 5,159,258 | 10/1992 | Kolvites et al. | 320/14 |

*Primary Examiner*—R. J. Hickey
*Attorney, Agent, or Firm*—Paul J. Maginot

[57] ABSTRACT

A method for displaying a charge level of a battery includes the steps of (1) displaying the charge level of the battery in a first manner during battery charging, and (2) displaying the charge level of the battery in a second manner which is different than the first manner during battery discharging. The first manner displaying step includes the step of operating a battery charge level indicator in a first mode, and the second manner displaying step includes the step of operating the battery charge level indicator in a second mode which is different than the first mode. In addition, a battery charge level indicator is disclosed and includes a display for indicating a charge level of a battery, and a mechanism for operating the display so as to indicate whether the battery is in a charge state of operation or a discharge state of operation.

10 Claims, 4 Drawing Sheets

FIG. 4

| CHARGE LEVEL ( IN % ) OF BATTERY PACK ( X ) | FIGURE WHICH SHOWS THE IMAGE DISPLAYED ON THE INDICATOR DURING CHARGING OF THE BATTERY PACK |
|---|---|
| X = 0 | FIG. 3A |
| 0 < X < 25 | FIG. 3B |
| 25 ≤ X < 50 | FIG. 3C |
| 50 ≤ X < 75 | FIG. 3D |
| 75 ≤ X < 100 | FIG. 3E |
| X = 100 | FIG. 3F |

FIG. 6

| CHARGE LEVEL ( IN % ) OF BATTERY PACK ( X ) | FIGURE WHICH SHOWS THE IMAGE DISPLAYED ON THE INDICATOR DURING DISCHARGING OF THE BATTERY PACK |
|---|---|
| 75 < X ≤ 100 | FIG. 5A |
| 50 < X ≤ 75 | FIG. 5B |
| 25 < X ≤ 50 | FIG. 5C |
| 5 < X ≤ 25 | FIG. 5D |
| 2 < X ≤ 5 | FIG. 5E |
| 0 ≤ X ≤ 2 | FIG. 5F |

METHOD AND APPARATUS FOR DISPLAYING A CHARGE LEVEL OF A BATTERY

BACKGROUND OF THE INVENTION

The present invention relates to a method and apparatus for displaying indicia and, more particularly, to a method and apparatus for displaying a charge level of a battery.

There have been, heretofore, numerous devices designed for displaying a charge level of a battery. For example, U.S. Pat. No. 5,130,659 describes a battery monitor which indicates the projected time until a battery reaches a lower threshold value indicative of the energy capacity of the battery. The battery monitor includes a microprocessor which iteratively reads the value of the battery voltage. The microprocessor then determines the rate of discharge of the battery and projects the future values of the battery voltage as well as the projected time at which the battery voltage attains the threshold voltage. This projected time is then displayed on a visual indicator, such as an LCD display. U.S. Pat. No. 5,043,651 discloses an apparatus having a rechargeable battery and a battery voltage detector which detects the output voltage of the battery to produce a detection signal when the output voltage falls below a predetermined threshold level. A controller stores a battery capacity value and accumulates the discharge of the battery to produce an accumulated capacity value. The controller also calculates a difference between the stored capacity value and the accumulated capacity value. Using the difference, a display displays the remaining charge value of the battery thereon. If the difference exceeds a predetermined value at a time the controller receives the detection signal, the controller changes the stored capacity value to a new capacity value. In addition, U.S. Pat. Nos. 5,105,180; 5,124,627; 5,130,658; and 5,130,659 disclose other devices for displaying the charge level of a battery.

However, while the charge level of a battery which is used to power an electrical apparatus, such as a portable computer, can be adequately displayed by one of the aforementioned devices, the user of the electrical apparatus may be unaware as to whether the battery is in the process of being charged. Also, it would be desirable if the charge level of the battery was displayed in a pleasant manner which allows easy determination of such charge level.

SUMMARY OF THE INVENTION

In accordance with one embodiment of the present invention, there is provided a method for displaying a charge level of a battery. The method includes the steps of (1) displaying the charge level of the battery in a first manner during battery charging, and (2) displaying the charge level of the battery in a second manner which is different than the first manner during battery discharging.

Pursuant to another embodiment of the present invention, there is provided a method for displaying a charge level of a battery adapted to power a portable computer, with the portable computer having a charge state of operation and a discharge state of operation. The method includes the steps of (1) displaying the charge level of the battery in a first manner during the charge state of operation of the portable computer, and (2) displaying the charge level of the battery in a second manner, which is different from the first manner, during the discharge state of operation of the portable computer.

According to still another embodiment of the present invention, there is provided a method for displaying a charge level of a battery adapted to power an electrical device, which includes the step of providing a battery charge level indicator which includes a first indicator portion and a second indicator portion, each representing a certain quantity of charge remaining in the battery of the electrical device. The method further includes the step of operating the battery charge indicator in a first mode of operation which includes the steps of (1) indicating a first charge level of the battery by flashing the first indicator portion while causing the second indicator portion to remain inactivated, and (2) indicating a second charge level of the battery by flashing the second indicator portion while causing the first indicator portion to remain activated.

Pursuant to yet another embodiment of the present invention, there is provided a battery charge level indicator which includes a display for indicating a charge level of a battery, and a mechanism for operating the display so as to indicate whether the battery is in a charge state of operation or a discharge state of operation.

Pursuant to still another embodiment of the present invention, there is provided a battery charge level indicator which includes a display for indicating a charge level of a battery, and a mechanism for operating the display in a first mode during battery charging and in a second mode during battery discharging, wherein the first mode is different from the second mode.

It is therefore an object of the present invention to provide a new and useful method and apparatus for displaying a charge level of a battery.

It is another object of the present invention to provide an improved method and apparatus for displaying a charge level of a battery.

It is yet another object of the present invention to provide a method and apparatus for displaying a charge level of a battery which is used to power an electrical device such as a portable computer, that can provide information to the user of the electrical device so that the user can determine whether the battery is in the process of being charged.

It is moreover another object of the present invention to provide a method and apparatus for displaying a charge level of a battery which is pleasant and allows easy determination of such charge level.

The above and other objects, features, and advantages of the present invention will become apparent from the following description and the attached drawings.

BRIEF DESCRIPTION OF THE DRAWINGS

FIG. 4 is a table presenting the variable "Figure which Shows the Image Displayed on the Indicator during Charging of the Battery Pack" as a function of the variable "Charge Level (in %) of the Battery Pack".

FIG. 6 is a table presenting the variable "Figure which Shows the Image Displayed on the Indicator during Discharging of the Battery Pack" as a function of the variable "Charge Level (in %) of the Battery Pack".

DETAILED DESCRIPTION OF THE PREFERRED EMBODIMENT

Figure 1:
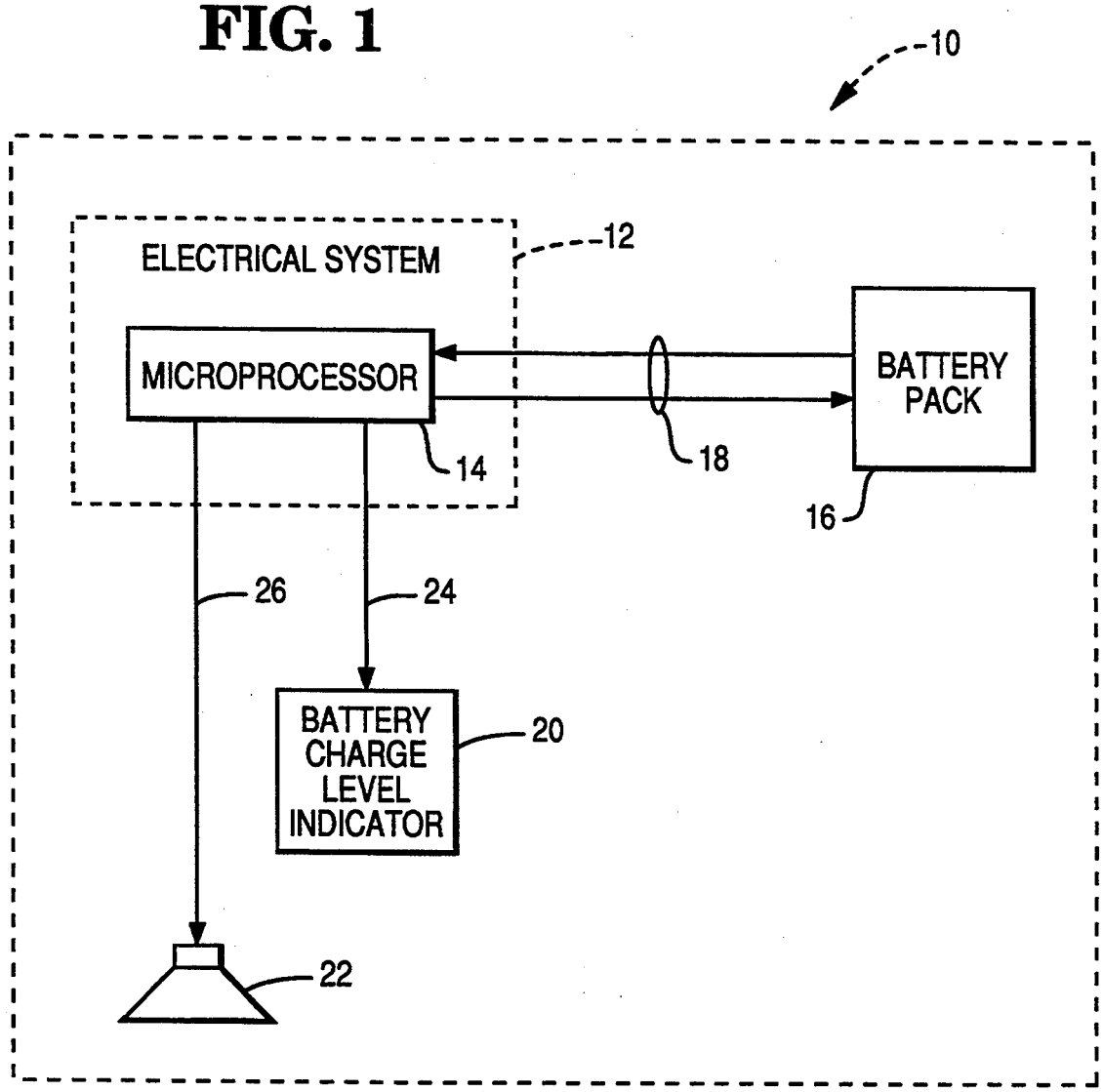
FIG. 1 is a block diagrammatic view of a portable computer incorporating the features of the present invention therein.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the intention is to cover all modifications, equivalents, and alternatives falling within the spirit and scope of the invention as defined by the appended claims.

Referring now to FIG. 1, there is shown a block diagram of a portable computer, generally indicated by the reference numeral 10, which incorporates the features of the present invention therein. The portable computer 10 includes an electrical system 12, a battery pack 16, a battery charge level indicator 20 and a loudspeaker 22. The electrical system 12 includes a microprocessor 14, The battery pack 16 is coupled via lines 18 to the microprocessor 14. The battery pack 16 includes a number of batteries plus circuitry which electrically communicates with the microprocessor 14. For example, the battery pack circuitry allows the microprocessor 14 to periodically poll the battery pack 16 in order to determine information regarding the charge level of the batteries contained in the battery pack. The indicator 20 is coupled via line 24 to the microprocessor 14 and interprets signals from the microprocessor so as to display information regarding the charge level of the batteries contained in the battery pack 16. Also, the loudspeaker 22 is coupled to the microprocessor 14 via line 26 and is activated so as to beep at predetermined times thereby indicating certain information regarding the charge level of the batteries contained in the battery pack.

Figure 2:
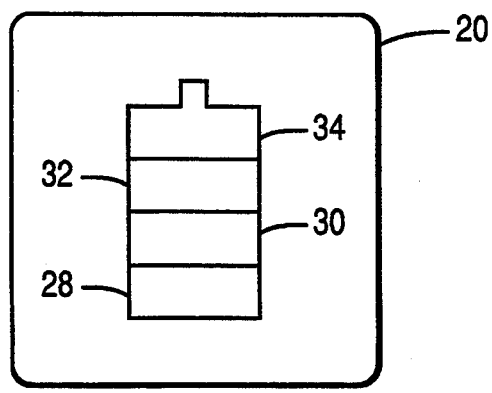
FIG. 2 is an elevational view of the indicator used in the portable computer of FIG. 1.

The indicator 20 is shown in more detail in FIG. 2. In particular, the indicator 20 includes four LCD display segments 28, 30, 32 and 34 each which may be activated to display an image. When display segments 28, 30, 32 and 34 are simultaneously activated, a two dimensional image of a battery is created on the indicator 20.

In accordance with one method of the present invention, the charge level of the battery pack 16 is displayed in a first manner during charging of the battery pack, and in a second manner which is different from the first manner, during discharging of the battery pack. The terms "charging of the battery pack", "charging of the battery", "battery pack charging", "battery charging" and "charge state of operation" are all used herein as meaning that the battery pack 16 is electrically coupled to an AC power source (not shown) so as to increase the total amount of electrical energy stored in the battery pack 16. Moreover, the terms "discharging of the battery pack", "discharging of the battery", "battery pack discharging", "battery discharging" and "discharge state of operation" are all used herein as meaning that the battery pack 16 is not electrically coupled to an AC power source and any electrical activity performed by the portable computer 10 causes a decrease in the total amount of electrical energy stored in the battery pack 16.

The first manner in which the charge level of the battery pack 16 is displayed includes operating the indicator 20 in a first mode during charging of the battery. The first mode of operating the indicator 20 is depicted in FIGS. 3A–3F. In FIGS. 3A–3F, each of the four LCD display segments may be shown as a solid display segment, or alternatively, a display segment filled with diagonal lines. For example, the display segment 28 is shown in FIG. 3B as a display segment filled with diagonal lines, and in FIG. 3C as a solid display segment. As used in FIGS. 3A–3F, a solid display segment indicates that the display segment is constantly activated, while a display segment filled with diagonal lines is periodically activated, or in other words, flashing, Therefore, the display segment 28 is flashing in FIG. 3B, while it is constantly activated in FIG. 3C.

Figure 3A:
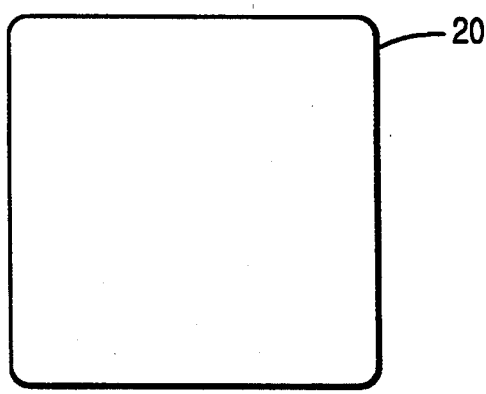
FIGS. 3A, 3B, 3C, 3D, 3E and 3F are each an elevational view of the indicator used in the portable computer of FIG. 1 with each of the FIGS. 3A, 3B, 3C, 3D, 3E and 3F showing the indicator representing a certain charge level of the battery pack used in the portable computer of FIG. 1 during its charge state of operation.
Figure 3B:
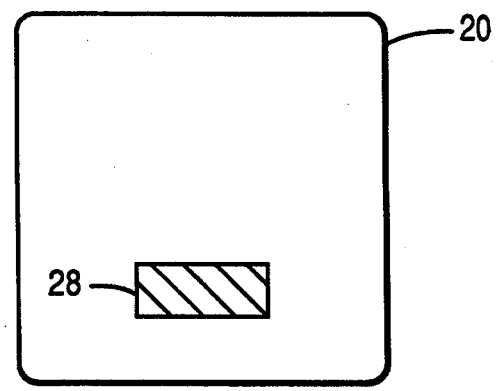
Figure 3C:
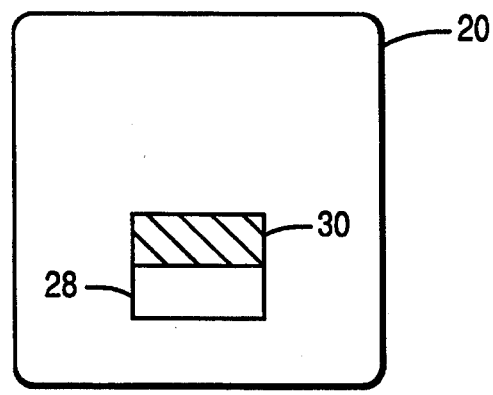
Figure 3D:
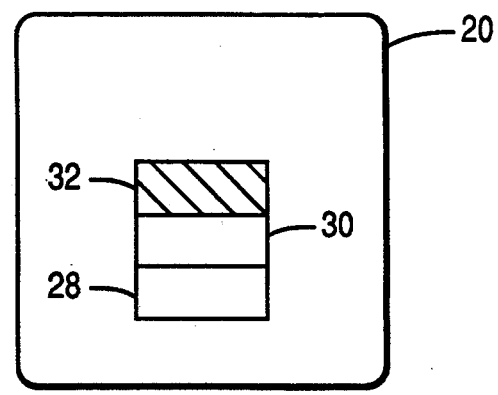
Figure 3E:
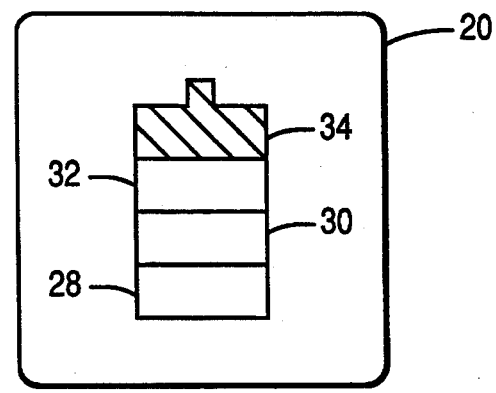
Figure 3F:
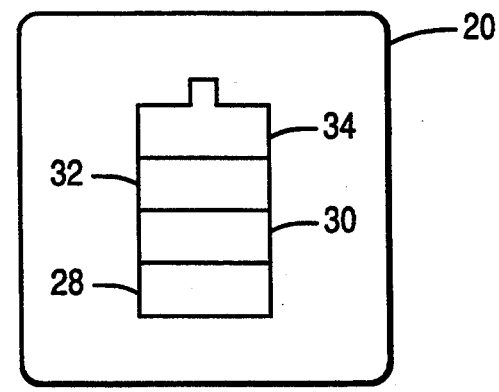

Again, the first manner in which the charge level of the battery pack 16 is displayed includes operating the indicator 20 in a first mode during charging of the battery and is depicted in FIGS. 3A–3F. Assuming that the battery pack 16 is substantially completely discharged, none of the four LCD display segments will be activated and the resulting image that is displayed on indicator 20 is depicted in FIG. 3A. As the battery pack 16 begins to charge, the resulting image that is displayed on the indicator 20 changes to the image depicted in FIG. 3B. This image will continue to be displayed on the indicator 20 until the charge level of the battery is 25% of full capacity. When the charge level of the battery increases to 25% of full battery capacity, the resulting image that is displayed on the indicator 20 changes to the image depicted in FIG. 3C. As the battery pack 16 further continues to charge, the image shown in FIG. 3C remains on the indicator 20 until the charge level of the battery is 50% of full capacity. When the charge level of the battery increases to 50% of full battery capacity, the resulting image that is displayed on the indicator 20 changes to the image depicted in FIG. 3D. As the battery pack 16 continues to charge, the image shown in FIG. 3D remains on the indicator 20 until the charge level of the battery is 75% of full capacity. When the charge level of the battery increases to 75% of full battery capacity, the resulting image that is displayed on the indicator 20 changes to the image depicted in FIG. 3E. As the battery pack 16 continues to charge, the image shown in FIG. 3E remains on the indicator 20 until the charge level of the battery is 100% of full capacity. When the charge level of the battery increases to 100% of full battery capacity, the resulting image that is displayed on the indicator 20 changes to the image depicted in FIG. 3F. A table presenting the variable "Figure which Shows the Image Displayed on the Indicator during Charging of the Battery Pack" as a function of the variable "Charge Level (in %) of the Battery Pack" is shown in FIG. 4.

Next, the second manner in which the charge level of the battery pack 16 is displayed includes operating the indicator 20 in a second mode during discharging of the battery. The second mode of operating the indicator 20 is depicted in FIGS. 5A–5F. In FIGS. 5A–5F, each of the four LCD display segments may be shown as a solid display segment, or alternatively, a display segment filled with crisscrossed lines. For example, the display segment 28 is shown in FIG. 5E as a display segment filled with crisscrossed lines, and in FIG. 5D as a solid display segment. As used in FIGS. 5A–5F, a solid display segment indicates that the display segment is constantly activated, while a display segment filled with crisscrossed lines is periodically activated, or in other words, flashing. Therefore, the display segment 28 is flashing in FIG. 5E, while it is constantly activated in FIG. 5D. However, the flash rate of a display segment that is filled with crisscrossed lines (see e.g., item 28 in FIG. 5E), as used herein, is twice as quick as the flash rate of a display segment that filled with diagonal lines (see e.g., item 28 in FIG. 3B). For example, if the display segment 28 of FIG. 3B was flashing at a rate of two displays per second, the display segment 28 of FIG. 5E would flash at a rate of four displays per second.

Figure 5A:
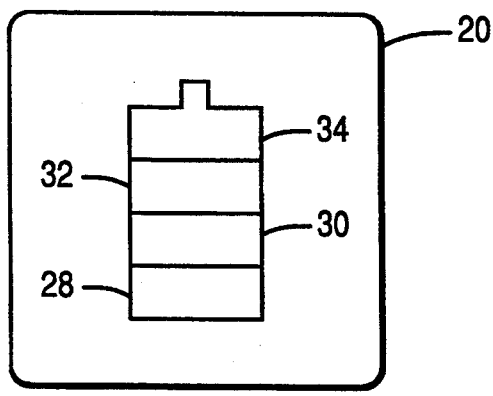
FIGS. 5A, 5B, 5C, 5D, 5E and 5F are each an elevational view of the indicator used in the portable computer of FIG. 1 with each of the FIGS. 5A, 5B, 5C, 5D, 5E and 5F showing the indicator representing a certain charge level of the battery pack used in the portable computer of FIG. 1 during its discharge state of operation.
Figure 5B:
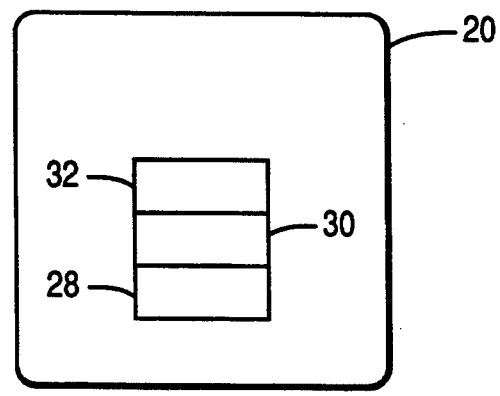
Figure 5C:
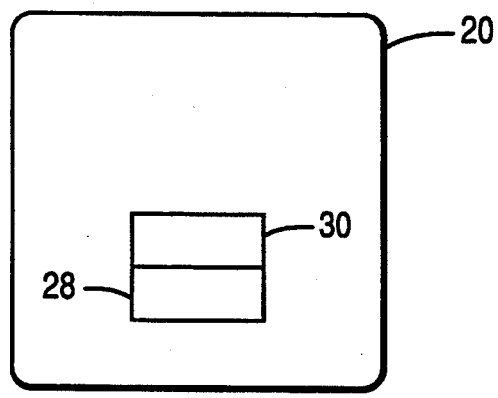
Figure 5D:
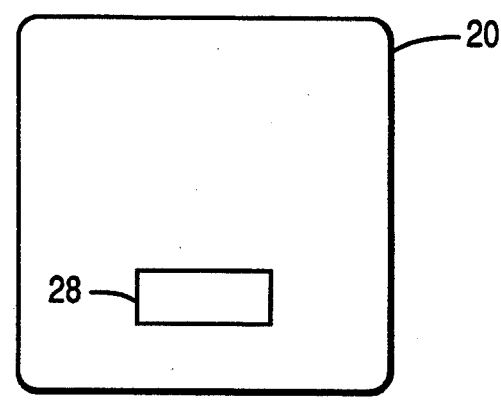
Figure 5E:
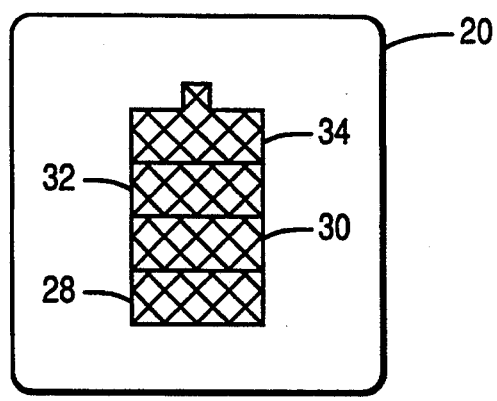
Figure 5F:
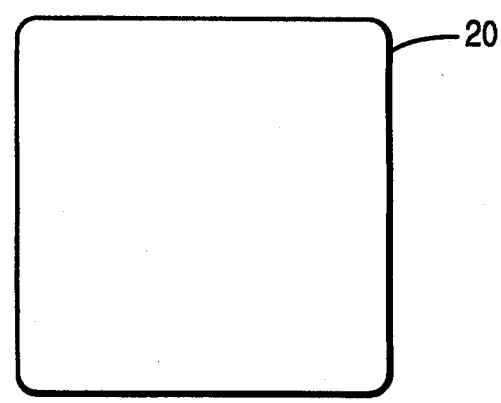

Again, the second manner in which the charge level of the battery pack 16 is displayed includes operating the indicator 20 in a second mode during discharging of the battery and is depicted in FIGS. 5A–5F. Assuming now that the battery pack 16 is completely charged (i.e. at 100% of full capacity), each of the four LCD display segments will be activated and the resulting image that is displayed on indicator 20 is depicted in FIG. 5A. When the battery pack 16 begins to discharge (due, for example, to electrical operation of the portable computer) the same image remains displayed on the indicator 20 as depicted in FIG. 5A. This image will continue to be displayed on the indicator 20 until the charge level of the battery is 75% of full capacity. When the charge level of the battery decreases to 75% of full battery capacity, the resulting image that is displayed on the indicator 20 changes to the image depicted in FIG. 5B. As the battery pack 16 continues to discharge, the image as shown in FIG. 5B remains on the indicator 20 until the charge level of the battery is 50% of full capacity. When the charge level of the battery decreases to 50% of full battery capacity, the resulting image that is displayed on the indicator 20 changes to the image depicted in FIG. 5C. As the battery pack 16 continues to discharge, the image as shown in FIG. 5C remains on the indicator 20 until the charge level of the battery is 25% of full capacity. When the charge level of the battery decreases to 25% of full battery capacity, the resulting image that is displayed on the indicator 20 changes to the image depicted in FIG. 5D. As the battery pack 16 continues to discharge, the image as shown in FIG. 5D remains on the indicator 20 until the charge level of the battery is 5% of full capacity. When the charge level of the battery decreases to 5% of full battery capacity, the resulting image that is displayed on the indicator 20 changes to the image depicted in FIG. 5E. At this point, the microprocessor 14 activates the loudspeaker 22 so as to beep five times thereby indicating a critically low charge level of the battery pack 16. As the battery pack 16 continues to discharge, the image as shown in FIG. 5E remains on the indicator 20 until the charge level of the battery is 2% of full capacity. However, when the charge level of the battery decreases to 3% of full battery capacity, the microprocessor 14 again activates the loudspeaker 22 so as to beep ten times thereby indicating an even more critically low charge level of the battery pack 16. As the battery pack 16 continues to discharge and the charge level of the battery decreases to 2% of full battery capacity, all of the indicator segments 28, 30, 32 and 34 deactivate so that the resulting image that is displayed on the indicator 20 changes to the image depicted in FIG. 5F. Note that when the charge level of the battery decreases to 2% of full battery capacity, the portable computer 10 automatically deactivates so as to preserve the remaining electrical energy in the battery pack 16. A table presenting the variable "Figure which Shows the Image Displayed on the Indicator during Discharging of the Battery Pack" as a function of the variable "Charge Level (in %) of the Battery Pack" is shown in FIG. 4.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected. For example, one of the preferred embodiments of the present invention has been described as a method and apparatus that indicates the charge level of a battery pack which includes a number of batteries. As a result, the present invention is applicable to a method and apparatus which indicates the charge level of a single battery, as well as a method and apparatus which indicates the charge level of two or more batteries.

What is claimed is:

1. A method for displaying charge levels of a battery, comprising the steps of:

displaying a first series of at least two different charge levels of the battery in a first manner during battery charging; and displaying a second series of at least two different charge levels of the battery in a second manner which is different than the first manner during battery discharging, wherein the first manner displaying step includes the step of operating a battery charge level indicator in a first mode, and the second manner displaying step includes the step of operating the battery charge level indicator in a second mode which is different than the first mode, wherein the battery charge level indicator includes a first indicator portion and a second indicator portion, each representing a certain quantity of charge remaining in the battery, and further wherein the first mode operating step includes the steps of:

indicating a first charge level of the first series by flashing the first indicator portion while causing the second indicator portion to remain inactivated; and indicating a second charge level of the first series by flashing the second indicator portion while causing the first indicator portion to remain activated.

2. The method of claim 1, wherein the second mode operating step includes the steps of:

indicating a first charge level of the second series by causing the first indicator portion to remain activated while causing the second indicator portion to remain inactivated; and indicating a second charge level of the second series by causing both the first indicator portion and the second indicator portion to remain activated.

3. A method for displaying charge levels of a battery adapted to power a portable computer, with the portable computer having a charge state of operation and a discharge state of operation, comprising the steps of:

displaying a first series of at least two different charge levels of the battery in a first manner during the charge state of operation of the portable computer; and displaying a second series of at least two different charge levels of the battery in a second manner, which is different from the first manner, during the discharge state of operation of the portable computer, wherein the first manner displaying step includes the step of operating a battery charge level indicator in a first model and the second manner displaying step includes the step of operating the battery charge level indicator in a second mode which is different than the first mode, wherein the battery charge level indicator includes a first indicator portion and a second indicator portion, each representing a certain quantity of charge remaining in the battery, and further wherein the first mode operating step includes the steps of:

indicating a first charge level of the first series by flashing the first indicator portion while causing the second indicator portion to remain inactivated; and indicating a second charge level of the first series by flashing the second indicator portion while causing the first indicator portion to remain activated.

4. The method of claim 3, wherein the second mode operating step includes the steps of:

indicating a first charge level of the second series by causing the first indicator portion to remain activated while causing the second indicator portion to remain inactivated; and indicating a second charge level of the second series by causing both the first indicator portion and the second indicator portion to remain activated.

5. A method for displaying charge levels of a battery adapted to power an electrical device, comprising the steps of:

providing a battery charge level indicator which includes a first indicator portion and a second indicator portion, each representing a certain quantity of charge remaining in the battery of the electrical device; and operating the battery charge indicator in a first mode of operation which includes the steps of:

indicating a first charge level of the battery by flashing the first indicator portion while causing the second indictor portion to remain inactivated; and indicating a second charge level of the battery by flashing the second indicator portion while causing the first indicator portion to remain activated.

6. The method of claim 5, further comprising the step of:

operating the battery charge indicator in a second mode of operation which includes the steps of:

indicating the first charge level of the battery by causing the first indicator portion to remain activated while causing the second indicator portion to remain inactivated; and indicating the second charge level of the battery by causing both the first indicator portion and the second indicator portion to remain activated.

7. The method of claim 2, wherein the first charge level of the first series is equal to the first charge level of the second series.

8. The method of claim 7, wherein the second charge level of the first series is equal to the second charge level of the second series.

9. The method of claim 4, wherein the first charge level of the first series is equal to the first charge level of the second series.

10. The method of claim 9, wherein the second charge level of the first series is equal to the second charge level of the second series.

* * * * *

UNITED STATES PATENT AND TRADEMARK OFFICE
CERTIFICATE OF CORRECTION

PATENT NO. : 5,406,188
DATED : April 11, 1995
INVENTOR(S) : Theodore A. Myslinski, et al.

It is certified that error appears in the above-indentified patent and that said Letters Patent is hereby corrected as shown below:

Column 7, line 19, delete "model" and substitute --mode--.

Signed and Sealed this

Fourteenth Day of November, 1995

*Attest:*

BRUCE LEHMAN

*Attesting Officer*     *Commissioner of Patents and Trademarks*